US006621958B1

(12) United States Patent
Dueck et al.

(10) Patent No.: US 6,621,958 B1
(45) Date of Patent: Sep. 16, 2003

(54) ATHERMALIZATION AND PRESSURE DESENSITIZATION OF DIFFRACTION GRATING BASED WDM DEVICES

(75) Inventors: Robert H. Dueck, Santa Ana, CA (US); Gregory G. Cappiello, Windham, NH (US)

(73) Assignee: Confluent Photonics Corporation, Salem, NH (US)

( * ) Notice: Subject to any disclaimer, the term of this patent is extended or adjusted under 35 U.S.C. 154(b) by 42 days.

(21) Appl. No.: 09/724,771

(22) Filed: Nov. 28, 2000

Related U.S. Application Data

(60) Provisional application No. 60/208,482, filed on Jun. 2, 2000, and provisional application No. 60/208,478, filed on Jun. 2, 2000.

(51) Int. Cl.[7] .................................................. G02B 6/34
(52) U.S. Cl. .............................. 385/37; 385/36; 385/24; 385/10; 385/33; 359/114; 359/115; 359/129; 359/130; 359/131
(58) Field of Search ............................... 385/37, 36, 33, 385/10, 24; 359/114, 115, 129, 130, 131

(56) References Cited

U.S. PATENT DOCUMENTS

| | | | |
|---|---|---|---|
| 5,799,118 A | 8/1998 | Ogusu et al. ............... 385/14 |
| 6,008,492 A | 12/1999 | Slater et al. ................ 250/334 |
| 6,011,884 A | 1/2000 | Dueck et al. ................ 385/24 |
| 6,134,359 A | 10/2000 | Keyworth et al. ........... 385/33 |
| 6,147,341 A | 11/2000 | Lemaire et al. ........ 250/227.17 |
| 6,169,838 B1 | 1/2001 | He et al. .................... 385/129 |
| 6,185,043 B1 * | 2/2001 | Imamura .................... 359/566 |
| 6,343,169 B1 | 1/2002 | Dempewolf et al. .......... 385/37 |

FOREIGN PATENT DOCUMENTS

| | | |
|---|---|---|
| JP | 58009119 | 1/1983 |
| JP | 06331850 | 2/1994 |
| WO | WO01/20372 A2 | 3/2001 |

* cited by examiner

*Primary Examiner*—David V. Bruce
*Assistant Examiner*—George Wang
(74) *Attorney, Agent, or Firm*—Hunton & Williams LLP

(57) ABSTRACT

A wavelength division multiplexer/demultiplexer (WDM) for use in an optical network has a structure for holding at least one optical component. A diffraction grating assembly having a substrate is held in relation to the at least one optical component by the structure. A lens assembly having a focal length is held in relation to the at least one optical component. The grating assembly has an angular dispersion that changes with temperature and the product of the focal length and angular dispersion remains constant over temperature.

44 Claims, 7 Drawing Sheets

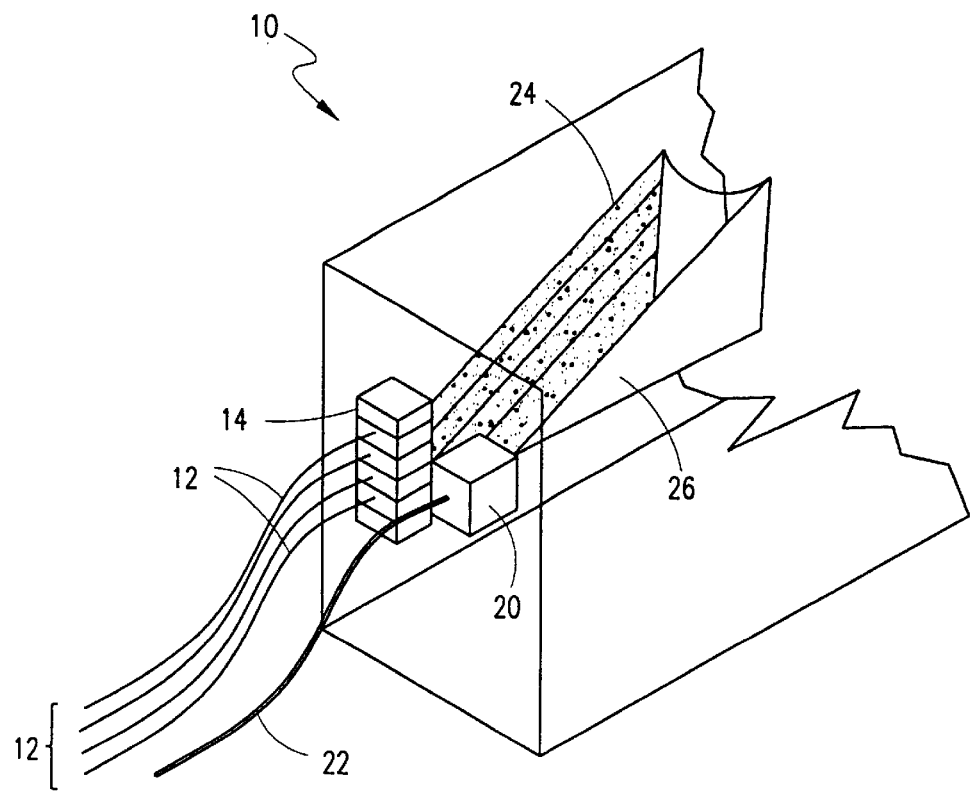
FIG. 2
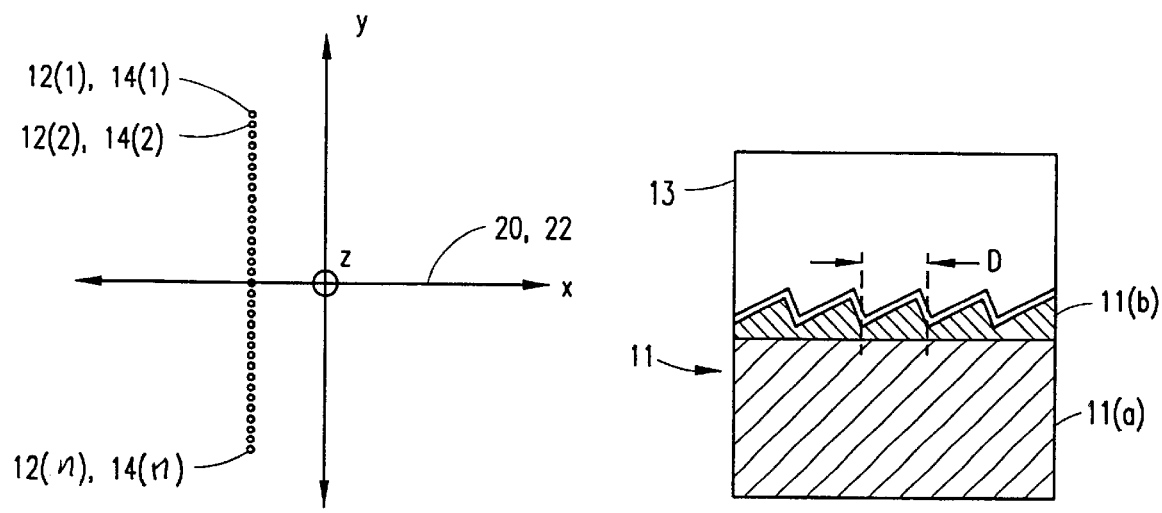
FIG. 3
FIG. 4

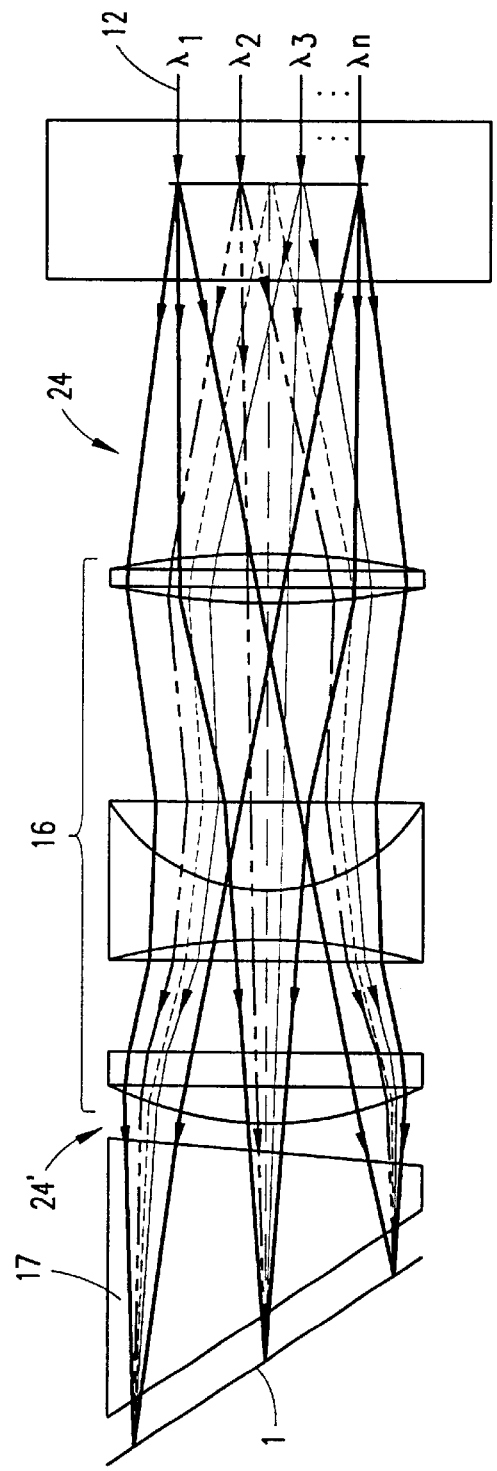
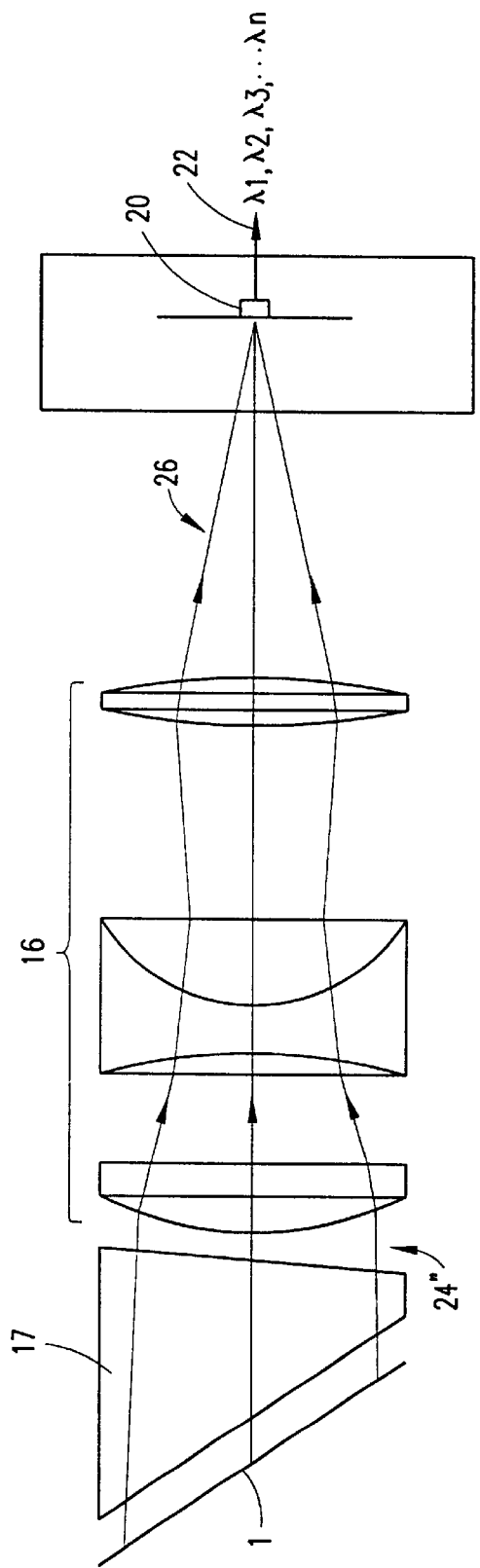
FIG. 5A
FIG. 5B

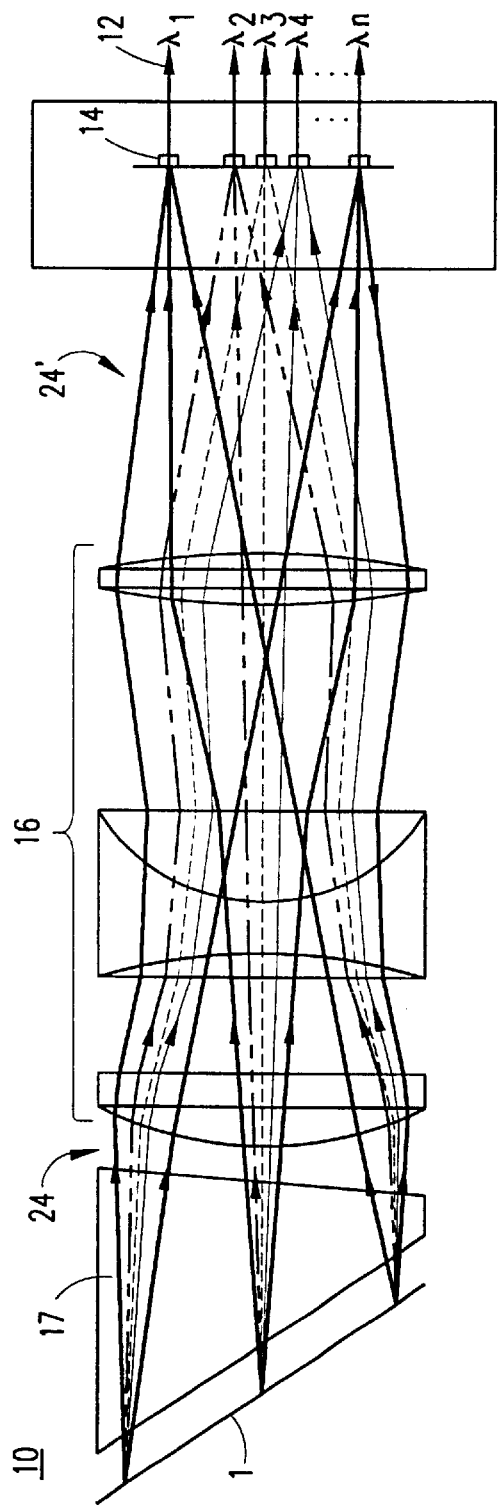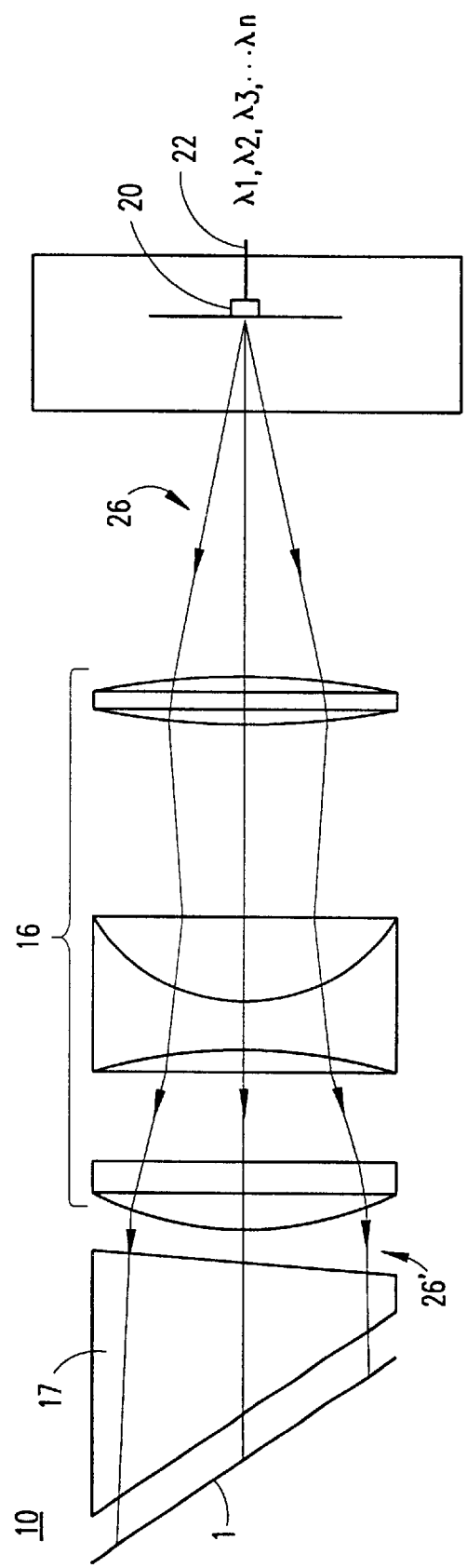
FIG. 5D
FIG. 5C

ATHERMALIZATION AND PRESSURE DESENSITIZATION OF DIFFRACTION GRATING BASED WDM DEVICES

CROSS-REFERENCE TO RELATED APPLICATIONS

This patent application is related to and claims priority from U.S. Provisional Patent Application No. 60/208,482 filed Jun. 2, 2000, which is hereby incorporated by reference herein in its entirety. This application is related to and claims priority from U.S. Provisional Patent Application No. 60/208,478 filed Jun. 2, 2000 which is incorporated by reference herein in its entirety. This application incorporates by reference herein in its entirety U.S. Patent Application entitled "Diffraction grating for Wavelength Division Multiplexing/Demultiplexing Devices" filed Nov. 28, 2000.

FIELD OF THE INVENTION

The present invention relates generally to wavelength division multiplexing, and more particularly, to minimizing losses from thermal and pressure effects on wavelength division multiplexing/demultiplexing devices.

BACKGROUND OF THE INVENTION

The telecommunications industry has grown significantly in recent years due to developments in technology, including the Internet, e-mail, cellular telephones, and fax machines. These technologies have become affordable to the average consumer such that the volume of traffic on telecommunications networks has grown significantly. Furthermore, as the Internet has evolved, more sophisticated applications have increased data volume being communicated across telecommunications networks.

To accommodate the increased data volume, the telecommunications network infrastructure has been evolving to increase the bandwidth of the telecommunications network. Fiber optic networks that carry wavelength division multiplexed optical signals or channels provide for significantly increased data channels for the high volume of traffic. The wavelength division multiplexed optical channels are comprised of narrow band or substantially monochromatic optical signals. The wavelength division multiplexed optical channels carry data packets containing information, including voice and data. Contemporary optical networks can include forty or more substantially monochromatic optical channels on a single fiber and each substantially monochromatic optical channel can carry many thousands of simultaneous telephone conversations or data transmissions, for example.

An important component of the fiber optic networks is a wavelength division multiplexer (WDM). A WDM is utilized to multiplex and demultiplex the wavelength division multiplexed optical signals to and from individual fibers in the fiber optic networks.

A WDM includes optical components that, in the case of demultiplexing, separate polychromatic optical signals into individual substantially monochromatic optical signals, and, in the case of multiplexing, combine substantially monochromatic optical signals into polychromatic signals. The optical components of one type of WDM include lenses for focusing and collimating the optical signals and a diffraction grating for diffracting the optical signals to perform the multiplexing and demultiplexing functions. Optionally, a prism is included. A diffraction grating component can comprise a moldable or castable material, such as epoxy, into which the diffraction grating profile is pressed, an optical reflective coating, such as gold or aluminum, that is coated onto the material, and a substrate into which the material is attached. The grating substrate provides thermal stability to maintain groove spacing of the diffraction grating. A support structure is used to either mount or house the optical components of the WDM.

Both the mechanical and optical components of the WDM are affected by changes in temperature. They expand and contract changing in shape and relative position, and also changing in optical properties. While the WDM inherently has losses, the changes due to temperature and pressure variations increase the inherent losses and affect the ability of the WDM to effectively transmit an optical signal. It is desirable to minimize the increase in losses, and therefore, there is a need for a WDM device that is pressure and/or thermally compensated, such as being abaric and/or athermal.

SUMMARY OF THE INVENTION

To overcome the adverse affects of changes in temperature and/or pressure, a WDM has been designed to pressure and/or temperature compensate. The WDM has a structure for holding at least one optical component. A diffraction grating assembly having a substrate is held in relation to the at least one optical component by the structure. A lens assembly having a focal length is held in relation to the at least one optical component. The coefficient of thermal expansion of the lens assembly and structure are approximately equal. The lens assembly is constructed from a material chosen to minimize its variance in focal length over temperature. The grating assembly has an angular dispersion that changes with temperature and the product of the focal length and angular dispersion remains constant over temperature. The WDM further comprises a prism having a change in index of refraction with temperature that is approximately equal to a negative of a coefficient of thermal expansion of the substrate. In the absence of a prism, the grating substrate has a coefficient of thermal expansion approximately equal to a negative of a coefficient of thermal expansion of air.

BRIEF DESCRIPTION OF THE DRAWINGS

A more complete understanding of the system and method of the present invention may be obtained by reference to the following Detailed Description when taken in conjunction with the accompanying Drawings wherein:

FIG. 2 is a perspective view of a portion of the wave division multiplexing/demultiplexing device of FIG. 1;

FIG. 3 is an end view of the portion of the wave division multiplexing/demultiplexing device of FIG. 1;

FIG. 4 illustrates a general construction of a diffraction grating assembly;

FIGS. 5A–5D illustrate multiplexing and demultiplexing functions of a wave division multiplexing/demultiplexing device;

DETAILED DESCRIPTION OF EXEMPLARY EMBODIMENTS

The present invention will now be described more fully hereinafter with reference to the accompanying drawings in which a preferred embodiment of the invention is shown.

Optical networks are utilized to handle telecommunications traffic caused in part by the Internet, mobile communications, and facsimile communications. To increase the bandwidth of optical networks, wavelength division multiplexers (WDM), including dense wavelength division multiplexers, have been developed to allow for multiple wavelengths of light, each containing a different data stream, to be carried by a single fiber optic line. WDM devices combine polychromatic optical signals into and separate polychromatic optical signals out from wavelength multiplexed fiber optic lines. Within one type of WDM, a diffraction grating is utilized to join a multiple number of substantially monochromatic optical signals from many fibers into a polychromatic optical signal on a single fiber in the multiplexing case, and separate a polychromatic optical signal from a single fiber into a multiple number of substantially monochromatic optical signals on multiple fibers in the demultiplexing case.

Figure 1:
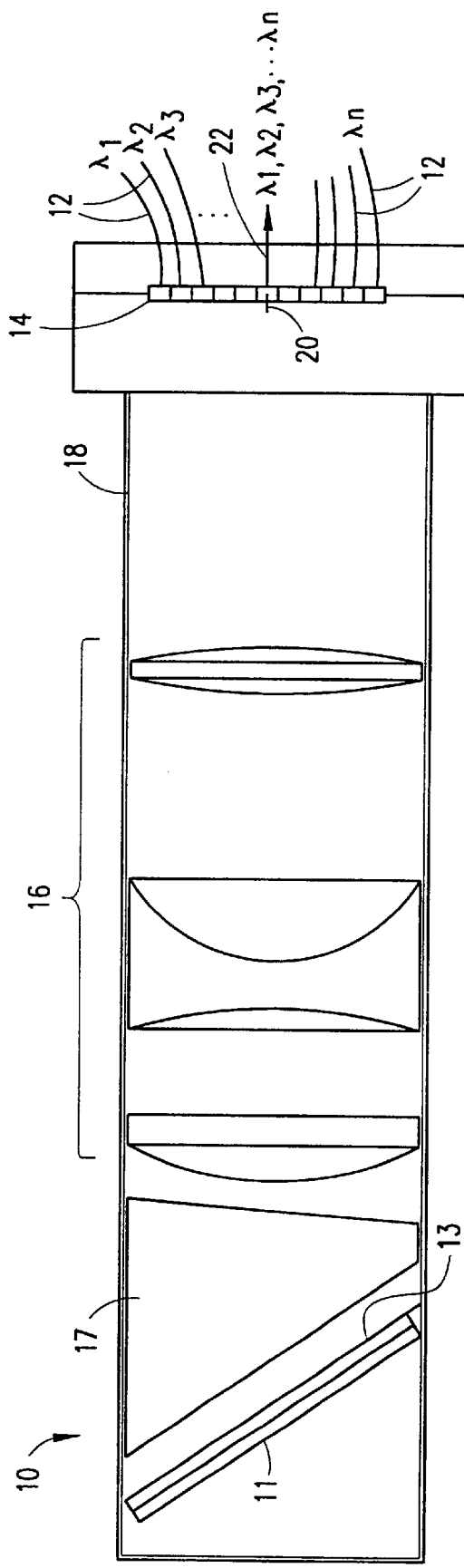
FIG. 1 is a side elevational view of a wave division multiplexing/demultiplexing device according to an embodiment of the present invention.

Referring to FIG. 1, there is shown a side view of a preferred embodiment of a wavelength division multiplexing/demultiplexing (WDM) device 10 in accordance with the present invention. The WDM device 10 comprises a plurality of first optical fibers 12, a corresponding plurality of first coupling components 14, a collimating/focusing lens 16 assembly, a prism 17, reflective diffraction grating assembly 11, a second coupling component 20, and a corresponding second optical fiber 22 shown in the multiplexing mode as indicated by the arrows representing the direction of the light. All of the above-identified components of the WDM device 10 are disposed along an optical axis X—X of the WDM 10, as will be described in more detail below.

End portions of the plurality of first optical fibers 12 are grouped into a one-dimensional fiber array (i.e., a 1×n array) by the first coupling components 14, while an end portion of the single second optical fiber 22 is secured to the output fiber coupling component 20. Both the first coupling components 14 and the second coupling component 20 are used for purposes of optical fiber securement, ease of optical fiber handling and precision optical fiber placement within WDM device 10. First and second coupling components may be, for example, a silicon V-groove assembly wherein the optical fibers 12 and 22 are sealed and aligned in V-shaped grooves formed in a silicon structure. Coupling components may also include patterned micro-optical components, known by those skilled in the art, for passband shape modification.

Referring to FIG. 2, there is shown a perspective end view of a portion of the WDM device 10 revealing how the plurality of first optical fibers 12 are grouped into the one-dimensional fiber array (a 1×4 array) by the first coupling components 14, and how the single second optical fiber 22 is secured to the second coupling component 20.

As shown in FIG. 3, the first coupling components 14 and the second coupling component 20 are disposed offset from, but symmetrically about, the optical axis X—X of the multiplexing device 10 so as to avoid signal interference between a polychromatic optical beam 26 appearing on or directed to second optical fiber 22 and a substantially monochromatic optical beam 24 appearing on or directed to any of the plurality of first optical fibers 12, or anywhere else. This offset spacing of the first coupling components 14 from the second coupling component 20 is determined based upon the characteristics of diffraction grating assembly 11, the wavelengths of each of the substantially monochromatic optical beams 24, and the focusing power of lens assembly 16.

Lens assembly 16 (FIG. 1) is adapted to collimate substantially monochromatic.optical beams 24 incident thereon. Lens assembly 16 has a relatively high level of transmission efficiency. The lens assembly may include a plano-convex homogeneous refractive index collimating/focusing lens assembly. Each lens in the lens assembly 16 may utilize a refraction glass material having a high index of refraction to insure efficient optic beam transmissions. For example, a preferred embodiment employs a triplet lens, as depicted in the FIG. 1.

Alternatively, the lens assembly 16 may include other lens types, lens numbers, lens configurations and lens compositions. In cases where diffraction grating assembly 11 is concave or otherwise non-planar, the use of lens assembly 16 within WDM device 10 may be unnecessary.

Lens assembly 16 can have telephoto characteristics, such as providing a telephoto lens assembly or a telephoto lens in the lens assembly. Use of a telephoto lens assembly 16 is advantageous, because lens assembly 16 can be smaller than would otherwise be required to achieve a given focal length. Thus, WDM 10 can be more compact.

A prism 17 may optionally be disposed between lens assembly 16 and diffraction grating assembly 11. Prism 17 bends optical signals from lens assembly 16 towards diffraction grating assembly 11. In doing so, prism 17 allows diffraction grating assembly 11 to be angularly disposed within a housing 18 of WDM device 10, as shown in FIG. 1. Prism 17 may be in direct contact with material 13 of diffraction grating assembly 11, or spaced therefrom. It is understood, however, that WDM device 10 may be utilized without prism 17.

Referring to FIG. 4, there is shown a cross-sectional view of a diffraction grating assembly 11 for use in the present invention. Diffraction grating assembly 11 is a reflective grating for reflecting optical and/or light rays diffracted therefrom. The grating assembly 11 comprises a substrate 11(*a*) covered by a diffractive surface 11(*b*). The diffractive surface 11(*b*) may be metallic, for example, aluminum or gold optionally, an optically transmissive material or coating 13 covers diffractive surface 11 (*b*). Grating substrate 11(*a*) may be constructed from a number of different substances. For example, substrate 11(*a*) may be a glass, metal or ceramic compound. As seen in FIG. 4, substrate 11(*a*) may have a substantially planar shape. It is understood, however, that substrate 11(*a*) may alternately include a substantially curved or concave surface (not shown) over which a diffraction grating surface is formed. Generally, as substrate 11(*a*) is a substantial portion of grating assembly 11, its thermal properties dominate.

The use of diffraction grating assembly 11 within WDM device 10 can result in a high efficiency device for performing substantially apolarized multiplexing/demultiplexing operations providing the grating meets appropriate design parameters. The term "apolarized" is used herein as meaning a signal condition in which the power of the transverse electric polarization state TE is equal to the power of the transverse magnetic polarization state TM at a pertinent wavelength or set of wavelengths. For instance, WDM device 10, in accordance with embodiments of the present invention, may achieve a polarization dependent loss of less than approximately 1 dB, and particularly less than 0.5 dB, with an insertion loss of less than 3 dB. With such high efficiency performance, the present WDM device 10 may be utilized as a passive device and in a substantially passive network. By eliminating the need for active components, WDM device 10 of the embodiments of the present invention thereby reduces power and conserves energy.

It is understood that although diffraction grating assembly 11 may be associated with and/or included in passive devices and networks, it is understood that diffraction grating assembly 11 may be utilized in devices and networks having active components which may perform one or more of a variety of active functions, including optical amplification.

Referring again to FIG. 1, diffraction grating assembly 11, prism 17, lens assembly 16, and coupling components 14 and 20 with their respective fibers 12 and 22 are held in relation along axis X—X by a housing 18. In the preferred embodiment, housing 18 can be tubular and is sized to closely receive grating assembly 11, prism 17, and lens assembly 16. It will be readily appreciated that housing 18 can be any other shape or structure which conveniently holds the components. It will also be appreciated that housing 18 could alternately be a flat plate which supports the components.

The operation of WDM device 10 will be described with reference to FIGS. 5A–5D. As mentioned above, WDM device 10 is capable of performing both multiplexing and demultiplexing functions. In the context of a multiplexing function, reference is made to FIGS. 5A and 5B.

In performing a multiplexing function, WDM device 10 generally receives a plurality of individual substantially monochromatic input signals collectively referred to as beams 24 at different wavelengths ($\lambda_1, \lambda_2, \lambda_3 \ldots \lambda_n$) and combines such signals to generate a polychromatic output signal or beam 26. Each of the plurality of substantially monochromatic optical input beams 24 are transmitted along and emitted from a corresponding first optical fiber 12 into the air space between the first coupling components 14 and lens assembly 16. Within this air space, the plurality of substantially monochromatic optical input beams 24 are expanded in diameter (best seen in FIG. 2) until they become incident upon the lens assembly 16. The lens assembly 16 collimates each of the plurality of substantially monochromatic optical input beams 24 (FIG. 5A), and transmits each collimated, substantially monochromatic optical input beam 24' to the diffraction grating assembly 11.

Referring to FIG. 5B, diffraction grating assembly 11 operates to angularly reflect the plurality of substantially monochromatic optical input beams 24' in Littrow and near-Littrow condition back towards lens assembly 16, generally shown as reflected beams 24". In doing so, the diffraction grating assembly 11 removes the angular separation of the plurality of collimated, substantially monochromatic optical input beams 24'. The Littrow condition is when the angle of incidence is equal to the reflected angle, and diffraction grating assembly 11 is angularly disposed so that at least one wavelength in a predetermined operating range of wavelengths (such as the C or L band) is in Littrow condition. Because beams 24' are incident on grating assembly 11 at different angles, only one is reflected in true Littrow condition. The others are reflected in near-Littrow condition. Lens assembly 16 focuses the reflected beams 24" towards second coupling component 20. The focused reflected beams 24" become incident upon the single second optical fiber 22 and combine in a multiplexed polychromatic optical output signal 26 at second coupling component 20. The single collimated, polychromatic optical output beam 26 contains each of the unique wavelengths of the plurality of the substantially monochromatic reflected beams 24". The single multiplexed, polychromatic optical output beam 26 is then coupled into the single second optical fiber 22 for transmission therethrough.

In the context of performing a demultiplexing operation, the operation of WDM device 10 will be described with reference to FIGS. 5C and 5D. In performing a demultiplexing function, WDM device 10 generally receives a single polychromatic input signal or beam 26 and generates a plurality of individual substantially monochromatic signals or beams 24 at different wavelengths from the single polychromatic input signal 26.

A single polychromatic optical input beam 26 is transmitted along and emitted from second optical fiber 22 into the air space between the second coupling component 20 and the lens assembly 16. Within this air space, the polychromatic optical input beam 26 is expanded in diameter (best seen in FIG. 2) until it becomes incident upon the lens assembly 16. The lens assembly 16 collimates the polychromatic optical input beam 26 towards diffraction grating assembly 11 as polychromatic optical beam 26' (FIG. 5C).

As stated above, diffraction grating assembly 11 operates to angularly diffract the polychromatic optical beam 261 into a plurality of substantially monochromatic optical beams 24, with each reflected substantially monochromatic beam 24 being diffracted at a distinct angle, relative to diffraction grating assembly 11, by an amount that is dependent upon the wavelength of the reflected substantially monochromatic beam 24. As shown in FIG. 5D, the diffraction grating assembly 11 reflects the substantially monochromatic signals 24 back towards the lens assembly 16. The lens assembly 16 focuses the plurality of substantially monochromatic optical input beams 24, and then transmits each collimated, substantially monochromatic optical beam 241 to the corresponding first coupling component 14 and corresponding first optical fiber 12. Each substantially monochromatic optical beam 24' becomes incident upon a corresponding first optical fiber 12. At this point, the substantially monochromatic signals 24' are then coupled to the first optical fibers 12 for transmission therethrough.

Both the mechanical and optical components of WDM 10 are affected by changes in temperature. The materials expand and contract changing the shape and relative position of components and changing optical properties of the system. This negatively impacts the ability of WDM 10 to efficiently transmit an optical signal, because it changes the intended path and focus of beams 24 and 26. Therefore, to minimize the insertion losses and maintain the efficiency of WDM 10, the thermal effects on components within WDM 10 are balanced.

To achieve maximum efficiency, polychromatic beam 26 should be focused and centered on the end of fiber 22 when multiplexing with WDM 10. When demultiplexing, each substantially monochromatic beam 24 is focused and centered on the end of its respective corresponding fiber 12. The distance between each beam 24 as it is projected on the end of its respective corresponding fiber 12 is herein referred to as "lateral spot separation". Thus, to be centered on fibers 12, the lateral spot separation of beams 24 must match the spacing of fibers 12.

Lens assembly 16 expands and contracts with temperature changing its optical properties. The index of refraction, and thus focal length, changes with temperature, tending to shift the focus, or focal plane, axially and substantially parallel to X—X away from the fiber ends 12. Also, as the index of refraction changes, the magnification of beams 24 changes, affecting the spot separation. As the magnification increases, the spot separation increases, causing beams 24 to deviate laterally (lateral expansion) from the ends of fibers 12. As the magnification decreases, the spot separation decreases, also causing deviations. (lateral contraction).

The change in optical properties of lens assembly 16 is compounded by the dimensional change of housing 18 with temperature. Housing 18 expands and contracts along axis X—X with temperature, which changes the relative distance between the fiber 12 ends and lens assembly 16. This has the same effect as changing the index of refraction of lens assembly 16, because it moves the fiber 12 ends and axially from the focal plane. Also, in WDM 10, couplings 14 and 20 expand and contract with temperature moving the fiber ends axially.

In addition, substrate 11(a) of grating assembly 11 expands and contracts with changes in temperature and affects the lateral spot separation and position. Also, the index of refraction of the air ($n_a$) between grating assembly 11 and lens assembly 16, and index of refraction of prism 17 ($n_p$), if included, changes with temperature. This too, affects the lateral spot separation and position. As substrate 11(a) expands, the spacing of diffraction surfaces, or grating period (D), increases. As the grating period (D) increases, the angle between diffracted substantially monochromatic beams 24, or angular dispersion, decreases. This can also be quantified in terms of linear dispersion, which is the product of angular dispersion and focal length. As the angular and thus linear dispersion decreases, the lateral spot separation decreases deviating from the ends of fibers 12 and increasing losses. Regarding position, the position of the entire ensemble of diffracted beams 24 shifts with changes in grating period (D). This also moves beams 24 from the ends of fibers 12 and increases losses.

Concerning the thermal effects on lens assembly 16, the change of refractive index can be quantified in terms of change in optical power with temperature. In an embodiment of lens assembly 16 having a single thin lens element of optical power ($\phi$), the change in power with temperature (t) is given by:

$$\frac{d\varphi}{dt} = \varphi \left[ \frac{\frac{dn}{dt}}{n-1} - CTE_L \right] = \varphi T \quad (1)$$

where $CTE_L$ is the coefficient of thermal expansion of the lens material and n is the refractive index of the lens in lens assembly 16.

The analysis can be applied to embodiments of lens assembly 16 having multiple lens elements. For a system of two lenses with separation d, the total optical power ($\phi_T$) is given by:

$$\phi_T = \phi_1 + \phi_2 - d\phi_1\phi_2 \quad (2)$$

Accounting for change in temperature, equation 2 becomes:

$$\frac{d\varphi_t}{dt} = [T_1\varphi_1 + T_2\varphi_2 - d(CTE_D)T_1\varphi_1 T_2\varphi_2]\Delta t \quad (3)$$

where $CTE_D$ is the coefficient of thermal expansion of a spacer element (not shown) between lens elements, and where T is the quantity in brackets in equation (1). One skilled in the art will understand that this analysis can be expanded to apply to additional thin lenses.

The material of lens assembly 16 is chosen with a relatively low change in refractive index with temperature (dn/dt), herein also referred to as coefficient of refractive index change, to minimize movement in focal image with temperature. It has been found that materials with an absolute change in refractive index with temperature (dn/dt) preferably between 0 and −2.5 PPM per ° C., yield the best results. Suitable materials can be purchased from Schott Glass, Inc. as product numbers SFL6 or SFL56, FK3, FK5, N-SF8, N-SF10, BAF50, LaF3, and LaF2, SF64A, K7 and LF5. This list is merely exemplary, and by no means is exhaustive. It will be understood that glasses from other suppliers having similar properties are suitable for lens assembly 16.

In addition to choosing a lens material having a low change in refractive index with temperature, the material of housing 18 and lens assembly 16 are chosen so that the expansion or contraction of housing 18 compensates as much as possible for axial shift in focal plane. In other words, a length of housing 18 between lens assembly 16 and fiber 12 ends changes substantially the same amount as the change in focal position of lens assembly 16 with temperature. Expressed mathematically:

$$CTE_M L \approx \Delta z \quad (4)$$

where $CTE_M$ is the expansion coefficient of housing 18, L is the length housing 18 between lens assembly 16 and fiber 12 ends, and $\Delta z$ is the axial change in position of the focal plane image. For a single lens:

$$\Delta z = \frac{1}{T\varphi} \quad (5)$$

One skilled in the art will understand that this can be expanded to apply to multiple lens systems by applying the same analysis as applied above.

The expansion coefficient of the material used in housing 18 yields the best results when the expansion coefficient is equal or almost equal preferably within 3 PPM/° C., to the coefficient of thermal expansion of lens assembly 16. Since most suitable materials for housing 18 will have a positive expansion coefficient, it is preferred that the value of the change in refractive index with temperature of lens assembly 16 be negative, so that its focal length will increase with temperature to compensate for increases in length of housing 18. By minimizing the change in index of refraction with temperature as described above and further compensating for axial shift in focal plane with housing 18, the axial shift in focal plane as seen by the fiber 12 ends can be as low as 0.01% of the focal length over a temperature range of 90° C. An axial shift in focal length of 6 $\mu$m of a focal length of 84 mm over a temperature range of −20° C. to 70° C. has been achieved. Suitable materials for use with the above mentioned lens glass types include titanium, titanium alloys, and martensitic stainless steel, such as AISI 410, 416, 420, and 440 series. It will be understood that materials having similar properties are suitable for housing 18, and that for different lens assembly 16 materials, different housing 18 materials may be suitable.

Concerning the thermal effects on grating assembly 11, the dispersive properties of grating 1 change as substrate 11(a) expands and contracts with temperature and increase losses in two ways. First, as substrate 11(a) expands and contracts, the angular dispersion, and thus linear dispersion, of reflected substantially monochromatic beams 24 changes affecting the lateral spot separation. Second, the change in dispersion affects the central wavelength position of the substantially monochromatic beams 24 transmitted to fibers 12, shifting the ensamble's position with respect to the fiber 12 positions.

Angular dispersion at Littrow can be derived from the grating equation. The grating equation at Littrow is:

$$\sin(\theta) = \frac{m\lambda}{2n_c D} \quad (6A)$$

where m is the diffraction order of the grating, $n_c$ is the refractive index of coating 13, D is the grating period, and $\theta$ is the Littrow angle of the diffraction grating. In more general terms, equation 6A can be expressed as:

$$\sin(\theta_d) = \frac{m\lambda}{n_c D} - \sin(\theta_i) \quad (6B)$$

where $\theta_d$ is the angle from a perpendicular to the grating surface at which beams 24 are diffracted and $\theta_1$ is the angle from perpendicular at which beam 26 is incident upon the grating surface. Taking the derivative of equation 6A with respect to wavelength $\lambda$, yields the angular dispersion at Littrow:

$$\frac{dL}{d\lambda} = \frac{m}{2n_c D \cos(\theta)} \quad (7)$$

where $dL/d\lambda$ is the angular dispersion in radians per wavelength. As described above, D changes with temperature as substrate 11(a) expands and contracts, and thus the angular dispersion changes.

Linear dispersion is the product of the angular dispersion and effective focal length, and focal length is the inverse optical power, hence:

$$LD = \frac{\frac{dL}{d\lambda}}{\varphi_T} \quad (8)$$

Therefore, linear dispersion and, correspondingly, lateral spot separation and position changes with temperature.

To minimize changes in lateral spot separation and linear dispersion resulting from geometrical changes in substrate 11(a), lens assembly 16 is configured to substantially compensate, and hold linear dispersion substantially constant, with its change in focal length. Thus, when temperature decreases angular dispersion of grating assembly 11 increases, focal length of lens assembly 16 decreases accordingly, and as angular dispersion decreases, focal length increases to keep linear dispersion substantially constant.

Figure 6:
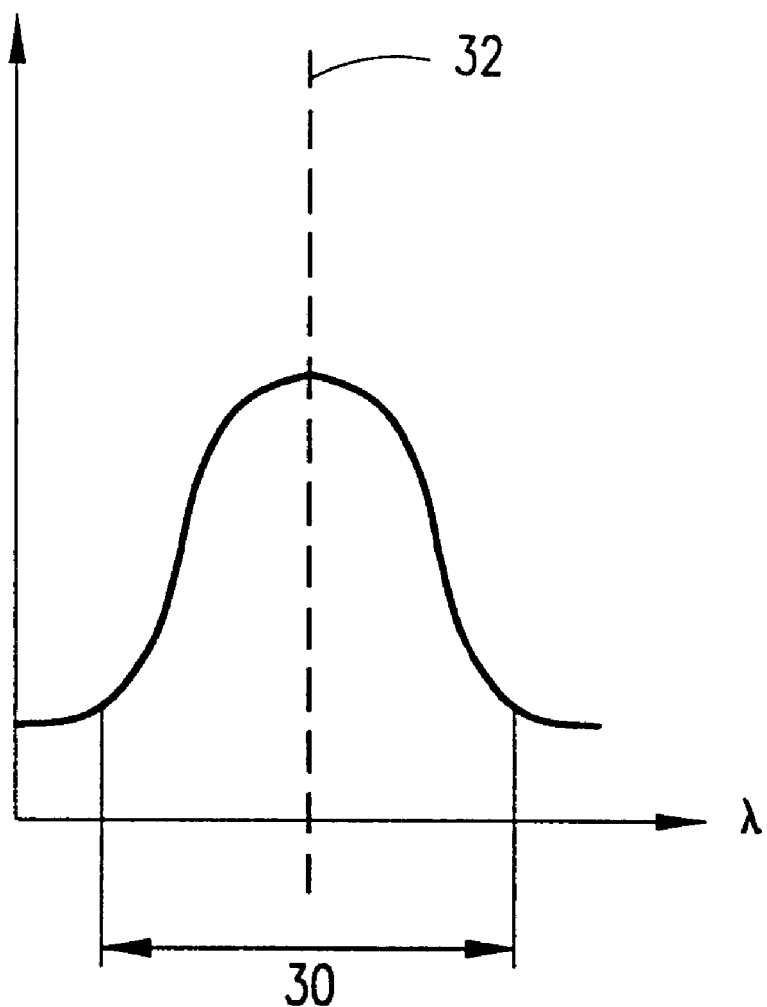
FIG. 6 illustrates a pass band and central wavelength of a substantially monochromatic beam.

The thermal effects on grating substrate 11(a) also increase losses by causing substantially monochromatic beams 24 to shift from their intended positions on fiber ends 12. Referring to FIG. 6, in practice, beams 24 are not truly monochromatic, but rather a tight range of wavelengths about a center frequency. Each beam 24 has a central wavelength 32 which is the representative wavelength to which an optical signal is associated. Each central wavelength 32 is generally predefined, and may correspond with an industry standard, such as the standards set by the International Telecommunication Union. As temperature changes the dispersion of grating assembly 11, beam 24 is no longer diffracted at the nominal angle (per equation 6B), and the central wavelength of beams 24 deviates from fiber 12 ends.

The index of refraction of prism 17, or the air between lens assembly 16 and grating assembly 11 if no prism 17 is present, changes with temperature. This can be balanced with the thermal effects of grating substrate 11(a). The change with temperature of the angular deviation of a beam incident on grating assembly 11 through a prism 17 can be approximated near Littrow by:

$$\frac{d\Delta}{dt} \approx \frac{-m\lambda}{[2n_p D[1 + (G+C)\Delta t]^2]}(G+C) \quad (9)$$

where G is the change in refractive index of the prism ($n_p$) over temperature range $\Delta t$, C is the product of the grating substrate 11(a) coefficient of thermal expansion and $\Delta t$, and $n_p$ is the index of refraction of the prism.

To minimize the thermal effects of substrate 11(a), materials of prism 17 and diffraction grating substrate 11(a) are chosen so that the change in refractive index of prism 17 with temperature and the coefficient of thermal expansion of grating substrate 11(a) sum close to zero. This minimizes the angular deviation of beams 24 with temperature, and thus minimizes the shift in center channel wavelength.

It has been found that by choosing the material of prism 17 to have a negative change in index of refraction with increasing temperature approximately equal to the positive coefficient of thermal expansion.of grating substrate 11(a), and preferably within a magnitude within 30% of the coefficient of thermal expansion of substrate 11(a), the best results are achieved.

When no prism 17 is used, a change in index of refraction of air with temperature is balanced with the expansion and contraction of substrate 11(a). The substrate material is chosen such that its coefficient of thermal expansion and the change in index of refraction of air with temperature sum close to zero. In an ideal case, substrate 11(a) has a coefficient of thermal expansion equal to a negative of the change in index of refraction of air. It has been found that by choosing the material of substrate 11(a) to have a coefficient of thermal expansion between 0.5 PPM/° C. and 1.5 PPM/° C., best results are achieved.

Variations in pressure can increase the insertion losses of WDM 10 much in the same way as the changes in temperature discussed above by causing variations in the path of beams 24 and 26. The most notable effect is the change in index of refraction of air, especially air between grating assembly 11 and lens assembly 16, with pressure. As pressure varies, the refractive index of air varies causing a shift in the center channel wavelength and shift from Littrow and near-Littrow condition. Prismic triangular regions of air within WDM 10 act as "air prisms" to refract beams 24.and 26. As pressure varies, the refractive index of air changes and affects how beams 24 and 26 are refracted, thus causing lateral shifts in the position of the center channel wavelength on fiber ends This affects WDM 10 as the atmospheric pressure changes due to changes in the weather, or WDM 10 is moved between locations of varying altitude.

Figure 7:
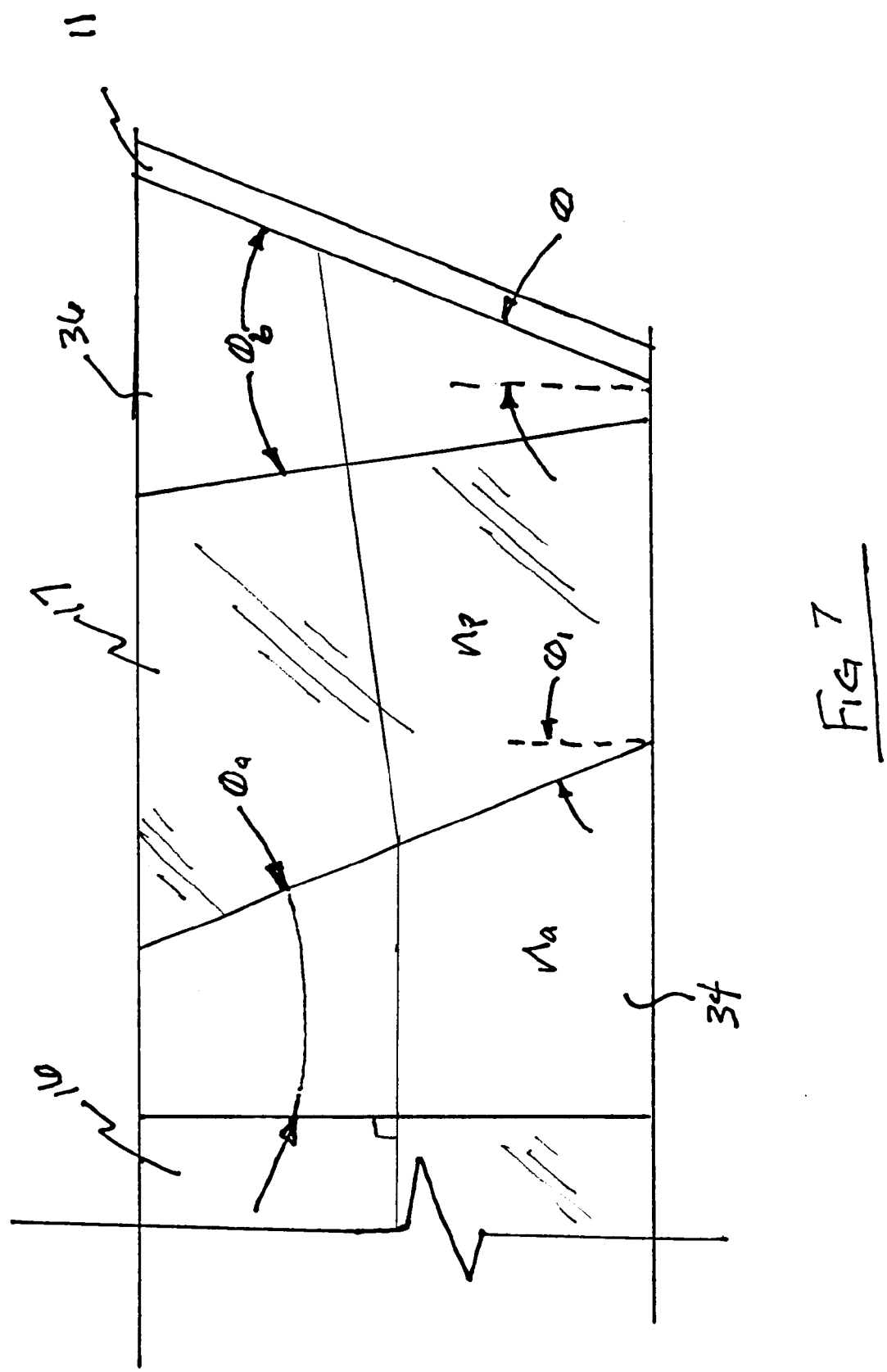
FIG. 7 illustrates the geometry of a prism.

Referring to FIG. 7, a prism or prisms 17 may be provided which form a prismic region of air 34, between prism 17 and lens assembly 16 that substantially balances the refraction of a corresponding prismic region of air 36 between prism 17 and diffraction grating 11. An angle ($\theta_a$) of air prism 34, measured between prism 17 and a perpendicular to an incident beam 24 or 26, is approximately equal to an angle ($\theta_b$) of air prism 36, measured between prism 17 and grating assembly 11. However, angles ea and Eb are directed in opposite directions, so that air prisms 34 and .36 are opposed as depicted in FIG. 7. This forms opposing air prisms 34 and 36, in which the refraction of one balances the refraction of the other. As pressure changes the index of refraction of the air, the change in refraction of one air prism 34 balances the change in refraction of the other 36.

Prism 17 can also be configured to create anamorphic beam compression of monochromatic beams 24 toward fiber ends 12. The anamorphic beam compression decreases the diameter of beams 24, and thus increases the angular deviation between beams. This increased angular deviation creates additional beam separation at fiber ends 12 for a given structure 18 length. Thus, a desired beam separation can be achieved in a shorter overall length of WDM 10, enabling WDM 10 to be compact.

Referring to FIG. 7, the anamorphic beam compression is accomplished by providing a prism 17 or prisms configured to maximize the compression. The angular magnification factor is given by:

$$M = \frac{\sqrt{1 - \left(\frac{n_a}{n_p}\sin(\theta_1)\right)^2}}{\cos(\theta_1)} \quad (10)$$

where $n_a$ is the index of refraction of air and $\theta_1$ is the front prism angle. Thus, $\theta_1$ and $n_p$ are optimized, taking into account other factors discussed above, to maximize the anamorphic beam compression.

Figure 8:
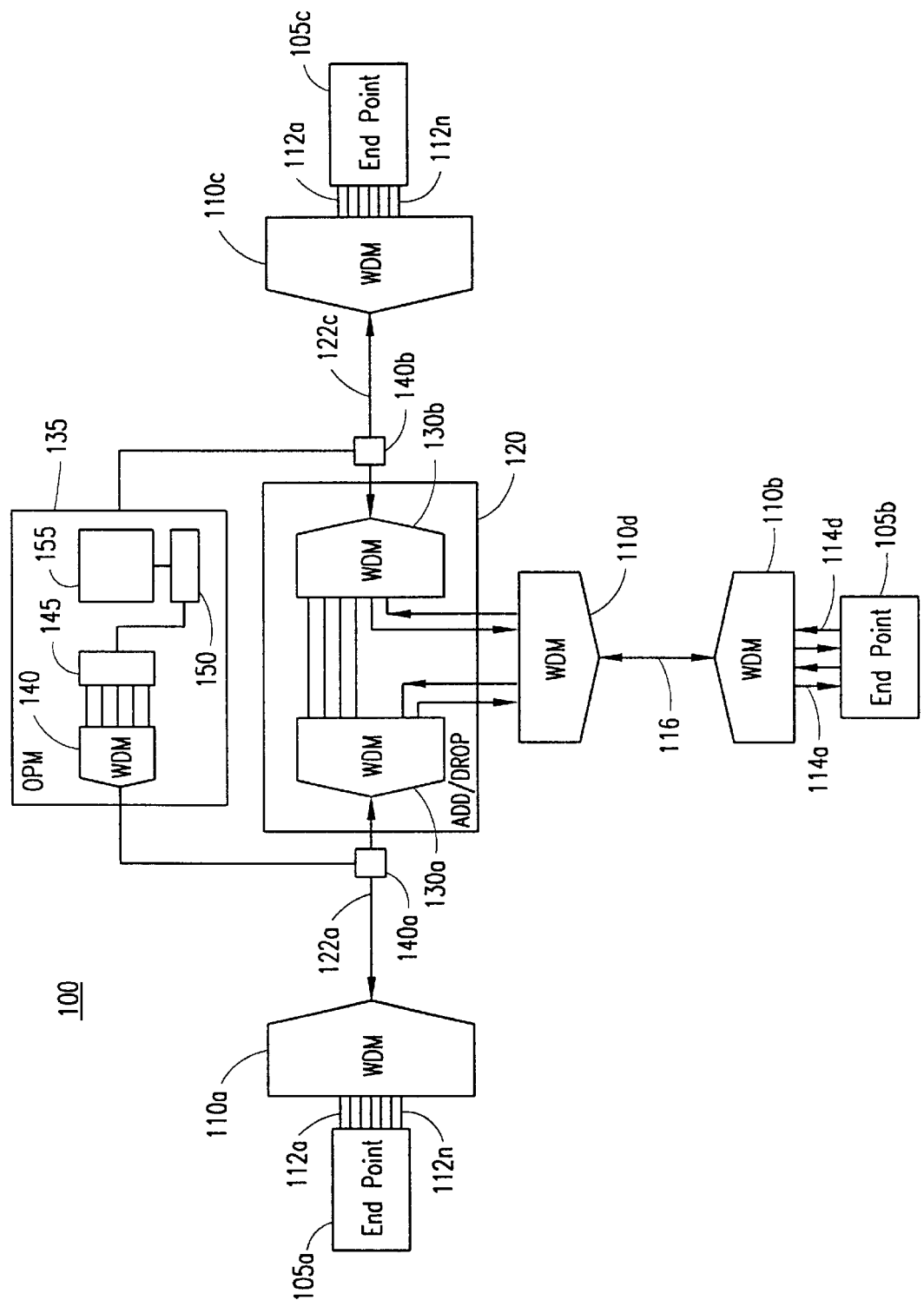
FIG. 8 is a block diagram of an optical communications system according to an embodiment of the present invention.

FIG. 8 is a block diagram of a fiber optic network 100 in accordance with an embodiment of the present invention. The fiber optic network 100 provides optical communication between end points 105a, 105b, and 105c. Each end point 105a, 105b, and 105c is coupled to a WDM 100a, 110b, and 110c, respectively, either optically or electrically. In the case of an optical coupling, each end point 105a and 105c communicates a multiple number of substantially monochromatic optical signals via fiber optic lines 112a–112n to the associated WDM 100a–110c, respectively. The end point 105b communicates a multiple number of substantially monochromatic optical signals via fiber optic lines 114a–114d to/from WDM 110b, which multiplexes the substantially monochromatic optical signals 114b, 114d to WDM 110d along fiber optic line 116.

The WDMs 100a and 110c are coupled via a wavelength add/drop device 120 between the fiber optic lines 122a and 122c, respectively. The wavelength add/drop device 120 is, in general terms, a simple form of a wavelength router with two input/output (I/O) ports and an additional third port wherein substantially monochromatic optical signals are added to/dropped from the incoming polychromatic optical signal appearing at either I/O port. Within the wavelength add/drop device 120, a pair of WDMs 130a–130b are utilized to separate a received polychromatic optical signal into a plurality of substantially monochromatic optical signals and communicate one or more of the substantially monochromatic optical signals to end point 105b, via the WDM 100d.

Optical performance monitor (OPM) 135 is further coupled to fiber optic lines 122a and 122c. Alternatively, the OPM 135 may be coupled to an individual fiber optic line. A polychromatic optical signal being monitored is tapped or extracted from the fiber optic line 122a, for example, via a beam splitter 140a, as is well known in the art. Because the WDM devices according to the principles of the present invention have a low polarization-dependent loss (PDL) and are substantially apolarizing, the beam splitter 140a may tap as little as 1% or less of the power of the monitored polychromatic signal to allow the OPM 135 to properly operate and provide the operator of the fiber optic network 100 valuable operating information, without substantially affecting the power level of the monitored polychromatic signal.

It is understood that beam splitter 140b may be utilized to tap a polychromatic signal appearing on fiber optic line 122c, and provide the tapped polychromatic signal to WDM 140.

As an example of how the fiber optic network 100 operates, the end point 105a may be located in Boston, the end point 105b may be located in Hartford, and the end point 105c may be located in New York City. A network service provider in Boston receives communication signals from local towns or cities via a communication system, such as a standard telephone network. The communication signals, which are destined to locations south of Boston (i.e., Hartford and New York City), are time-division multiplexed onto substantially monochromatic optical signals and delivered to the WDM 110a. The WDM 110a performs a wave division multiplexing operation on the substantially monochromatic optical signals and the resulting polychromatic optical signal is transmitted onto the fiber optic network 100 via the fiber optic line 122a. Upon the polychromatic optical signal reaching a network service provider between Boston and Hartford at add/drop device 120, the polychromatic optical signal is demultiplexed by the WDM 130a in the wavelength add/drop device 120. The substantially monochromatic optical signals that are destined for New York City may be re-multiplexed by the WDM 130b and sent to New York City along fiber optic line 122c. The substantially monochromatic signals destined for Hartford, on the other hand, may be multiplexed with other substantially monochromatic signals (having different wavelengths) at WDM 110d and delivered to the end point 105b in Hartford.

In addition, local communication signals originating from Hartford may be added to either WDM 130a or 130b to be transmitted to either Boston or New York City, respectively, based upon the optical frequency that the communication signals are placed. The substantially monochromatic optical signals are multiplexed by WDM 130b into a polychromatic optical signal and demultiplexed by WDM 110c in New York City. It should be understood that the fiber optic lines (e.g., 112a, 122a, 116, 122c) are bidirectional such that optical communication can be performed in either direction. The network service provider associated with add/drop device 120 additionally may monitor the system performance (e.g., channel power) using the OPM 135 to ensure system quality.

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

What is claimed is:

1. A WDM comprising:
   a structure extending longitudinally from one end to another for supporting components of the WDM;
   at least two optical components supported at the one end of the structure for transmitting and receiving optical signals;

a diffraction grating supported at the other end of the structure-for diffracting the optical signals from the optical components;

a lens assembly supported by the structure and disposed between the optical components and the diffraction grating, the lens having a focal length for focusing the optical signals in relation to the optical components;

wherein the diffraction grating has an angular dispersion that changes with temperature, and the product of the focal length and angular dispersion remains substantially constant with temperature; and wherein a coefficient of thermal expansion of the structure and the change in index of refraction with temperature of the lens are values selected so that the length of the structure changes proportionally with the focal length of the lens in response to temperature changes in the structure and lens, whereby the lens remains substantially focused in relation to the optical components.

2. The WDM of claim 1 wherein the structure has a first coefficient of thermal expansion and the lens assembly has a second coefficient of thermal expansion, and wherein the first and second coefficients of thermal expansion are approximately equal.

3. The WDM of claim 1 wherein the structure has a coefficient of thermal expansion within 3 PPM/degree Celsius of a coefficient of thermal expansion of the lens assembly.

4. The WDM of claim 1 wherein the lens assembly is constructed of a material chosen.to minimize its variance in focal length over temperature.

5. A WDM comprising:

a structure extending longitudinally from one end to another for supporting components of the WDM;

at least two optical components supported at the one end of the structure for transmitting and receiving optical signals;

a diffraction grating supported at the other end of the structure for diffracting the optical signals from the optical components;

a lens assembly supported by the structure and disposed between the optical components and the diffraction grating, the lens having a focal length for focusing the optical signals in relation to the optical components;

wherein the diffraction grating has an angular dispersion that changes with temperature, and the product of the focal length and angular dispersion remains substantially constant with temperature; and wherein the lens assembly has a change of index of refraction with temperature from 0 to −2.5 PPM/degree Celsius.

6. A WDM comprising:

a structure extending longitudinally from one end to another for supporting components of the WDM;

at least two optical components supported at the one end of the structure for transmitting and receiving optical signals;

a diffraction grating supported at the other end of the structure for diffracting the optical signals from the optical components;

a lens assembly supported by the structure and disposed between the optical components and the diffraction grating, the lens having a focal length for focusing the optical signals in relation to the optical components;

wherein the diffraction grating has an angular dispersion that changes with temperature, and the product of the focal length and angular dispersion remains substantially constant with temperature;

a prism supported by the structure and disposed between the lens assembly and diffraction grating, the prism having an angular dispersion that changes with temperature; and wherein the product of the focal length and the sum of the angular dispersion of the prism and the angular dispersion of the grating remains substantially constant with temperature.

7. A WDM comprising:

a structure extending longitudinally from one end to another for supporting components of the WDM;

at least two optical components supported at the one end of the structure for transmitting and receiving optical signals;

a diffraction grating supported at the other end of the structure for diffracting the optical signals from the optical components;

a lens assembly supported by the structure and disposed between the optical components and the diffraction grating, the lens having a focal length for focusing the optical signals in relation to the optical components;

wherein the diffraction grating has an angular dispersion that changes with temperature, and the product of the focal length and angular dispersion remains substantially constant with temperature;

a prism supported by the structure and disposed between the lens assembly and diffraction grating; and wherein a change in index of refraction with temperature of the prism is a value approximately equal to a negative value of a coefficient of thermal expansion of the diffraction grating.

8. The WDM of claim 7 further comprising a prism supported by the structure and disposed between the lens assembly and diffraction grating; and wherein a change in index of refraction with temperature of the prism is a value substantially within 30% of a negative value of a coefficient of thermal expansion of the diffraction grating.

9. A WDM comprising:

a structure extending longitudinally from one end to another for supporting components of the WDM;

at least two optical components supported at the one end of the structure for transmitting and receiving optical signals;

a diffraction grating supported at the other end of the structure for diffracting the optical signals from the optical components;

a lens assembly supported by the structure and disposed between the optical components and the diffraction grating, the lens having a focal length for focusing the optical signals in relation to the optical components;

wherein the diffraction grating has an angular dispersion that changes with temperature, and the product of the focal length and angular dispersion remains substantially constant with temperature; and wherein the diffraction grating has a coefficient of thermal expansion which is a value approximately equal to a negative value of a change in index of refraction of air.

10. The WDM of claim 9 wherein the diffraction grating has a coefficient of thermal expansion of 0.5 PPM/degree Celsius to 1.5 PPM/degree Celsius.

11. A WDM comprising:
- a structure extending longitudinally from one end to another for supporting components of the WDM;
- at least two optical components supported at the one end of the structure for transmitting and receiving optical signals;
- a diffraction grating supported at the other end of the structure for diffracting the optical signals from the optical components;
- a lens assembly supported by the structure and disposed between the optical components and the diffraction grating, the lens having a focal length for focusing the optical signals in relation to the optical components;
- wherein the diffraction grating has an angular dispersion that changes with temperature, and the product of the focal length and angular dispersion remains substantially constant with temperature;
- a prism supported by the structure and disposed between the lens assembly and diffraction grating; and
- wherein the prism is configured to anamorphically compress the diffracted optical signals.

12. The WDM of claim 1 wherein the lens assembly comprises a telephoto lens.

13. A WDM comprising:
- a structure extending longitudinally from one end to another for supporting components of the WDM;
- at least two optical components supported at the one end of the structure for transmitting and receiving optical signals;
- a diffraction grating supported at the other end of the structure for diffracting the optical signals from the optical components;
- a lens assembly supported by the structure and disposed between the optical components and the diffraction grating, the lens having a focal length for focusing the optical signals in relation to the optical components;
- a prism supported by the structure and disposed between the diffraction grating and the lens assembly; and
- wherein a change in index of refraction with temperature of the prism is a value approximately equal to a negative value of a coefficient of thermal expansion of the diffraction grating, whereby the lens remains focused in relation to the optical components.

14. The WDM of claim 13 wherein the structure has a first coefficient of thermal expansion and the lens assembly has a second coefficient of thermal expansion, and wherein the first and second coefficients of thermal expansion are approximately equal.

15. The WDM of claim 13 wherein the structure has a coefficient of thermal expansion within 3 PPM/degree Celsius of a coefficient of thermal expansion of the lens assembly.

16. The WDM of claim 13 wherein the lens assembly is constructed of a material chosen to minimize its variance in focal length over temperature.

17. The WDM of claim 13 wherein the lens assembly has a change of index of refraction with temperature from 0 to −2.5 PPM/degree Celsius.

18. The WDM of claim 13 wherein the product of a focal length and the sum of an angular dispersion of the prism and an angular dispersion of the grating remains substantially constant with temperature.

19. The WDM of claim 13 wherein a change in index of refraction with temperature of the prism is a value substantially within 30% of a negative value of a coefficient of thermal expansion of the diffraction grating.

20. The WDM of claim 13 wherein a coefficient of thermal expansion of the structure and the change in index of refraction with temperature of the lens are values selected so that the length of the structure changes proportionally with the focal length of the lens in response to temperature changes in the structure and lens, whereby the lens remains substantially focused in relation to the optical components.

21. The WDM of claim 13 wherein the prism is configured to anamorphically compress the diffracted optical signals.

22. The WDM of claim 13 wherein the lens assembly comprises a telephoto lens.

23. An optical network having a wavelength division multiplexer/demultiplexer (WDM) comprising:
- a structure extending longitudinally from one end to another for supporting components of the WDM;
- at least two optical components supported at the one end of the structure for transmitting and receiving optical signals;
- a diffraction grating supported at the other end of the structure for diffracting the optical signals from the optical components;
- a lens assembly supported by the structure and disposed between the optical components and the diffraction grating, the lens having a focal length for focusing the optical signals in relation to the optical components;
- wherein the diffraction grating has an angular dispersion that changes with temperature, and the product of the focal length and angular dispersion remains substantially constant with temperature; and
- wherein a coefficient of thermal expansion of the structure and the change in index of refraction with temperature of the lens are values selected so that the length of the structure changes proportionally with the focal length of the lens in response to temperature changes in the structure and lens, whereby the lens remains substantially focused in relation to the optical components.

24. The optical network of claim 23 wherein the structure has a first coefficient of thermal expansion and the lens assembly has a second coefficient of thermal expansion, and wherein the first and second coefficients of thermal expansion are approximately equal.

25. The optical network of claim 23 wherein the structure has a coefficient of thermal expansion within 3 PPM/degree Celsius of a coefficient of thermal expansion of the lens assembly.

26. The optical network of claim 23 wherein the lens assembly is constructed of a material chosen to minimize its variance in focal length over temperature.

27. An optical network having a wavelength division multiplexer/demultiplexer (WDM) comprising:
- a structure extending longitudinally from one end to another for supporting components of the WDM;
- at least two optical components supported at the one end of the structure for transmitting and receiving optical signals;
- a diffraction grating supported at the other end of the structure for diffracting the optical signals from the optical components;
- a lens assembly supported by the structure and disposed between the optical components and the diffraction grating, the lens having a focal length for focusing the optical signals in relation to the optical components;
- wherein the diffraction grating has an angular dispersion that changes with temperature, and the product of the focal length and angular dispersion remains substantially constant with temperature; and wherein the lens assembly has a change of index of refraction with temperature from 0 to −2.5 PPM/degree Celsius.

28. An optical network having a wavelength division multiplexer/demultiplexer (WDM) comprising:

a structure extending longitudinally from one end to another for supporting components of the WDM;

at least two optical components supported at the one end of the structure for transmitting and receiving optical signals;

a diffraction grating supported at the other end of the structure for diffracting the optical signals from the optical components;

a lens assembly supported by the structure and disposed between the optical components and the diffraction grating, the lens having a focal length for focusing the optical signals in relation to the optical components;

wherein the diffraction grating has an angular dispersion that changes with temperature, and the product of the focal length and angular dispersion remains substantially constant with temperature; and a prism supported by the structure and disposed between the lens assembly and diffraction grating, the prism having an angular dispersion that changes with temperature;

wherein the product of the focal length and the sum of the angular dispersion of the prism and the angular dispersion of the grating remains substantially constant with temperature.

29. An optical network having a wavelength division multiplexer/demultiplexer (WDM) comprising:

a structure extending longitudinally from one end to another for supporting components of the WDM;

at least two optical components supported at the one end of the structure for transmitting and receiving optical signals;

a diffraction grating supported at the other end of the structure for diffracting the optical signals from the optical components;

a lens assembly supported by the structure and disposed between the optical components and the diffraction grating the lens having a focal length for focusing the optical signals in relation to the optical components;

wherein the diffraction grating has an angular dispersion that changes with temperature, and the product of the focal length and angular dispersion remains substantially constant with temperature;

a prism supported by the structure and disposed between the lens assembly and diffraction grating; and wherein a change in index of refraction with temperature of the prism is a value approximately equal to a negative value of a coefficient of thermal expansion of the diffraction grating.

30. The optical network of claim 29 further comprising a prism supported by the structure and disposed between the lens assembly and diffraction grating; and wherein a change in index of refraction with temperature of the prism is a value substantially within 30% of a negative value of a coefficient of thermal expansion of the diffraction grating.

31. An optical network having a wavelength division multiplexer/demultiplexer (WDM) comprising:

a structure extending longitudinally from one end to another for supporting components of the WDM;

at least two optical components supported at the one end of the structure for transmitting and receiving optical signals;

a diffraction grating supported at the other end of the structure for diffracting the optical signals from the optical components;

a lens assembly supported by the structure and disposed between the optical components and the diffraction grating, the lens having a focal length for focusing the optical signals in relation to the optical components;

wherein the diffraction grating has an angular dispersion that changes with temperature, and the product of the focal length and angular dispersion remains substantially constant with temperature; and wherein the diffraction grating has a coefficient of thermal expansion which is a value approximately equal to a negative value of a change in index of refraction of air.

32. The optical network of claim 31 wherein the diffraction grating has a coefficient of thermal expansion of 0.5 PPM/degree Celsius to 1.5 PPM/degree Celsius.

33. An optical network having a wavelength division multiplexer/demultiplexer (WDM) comprising:

a structure extending longitudinally from one end to another for supporting components of the WDM;

at least two optical components supported at the one end of the structure for transmitting and receiving optical signals;

a diffraction grating supported at the other end of the structure for diffracting the optical signals from the optical components;

a lens assembly supported by the structure and disposed between the optical components and the diffraction grating, the lens having a focal length for focusing the optical signals in relation to the optical components;

wherein the diffraction grating has an angular dispersion that changes with temperature, and the product of the focal length and angular dispersion remains substantially constant with temperature;

a prism supported by the structure and disposed between the lens assembly and diffraction grating; and wherein the prism is configured to anamorphically compress the diffracted optical signals.

34. The optical network of claim 23 wherein the lens assembly comprises a telephoto lens.

35. An optical network having a wavelength division multiplexer/demultiplexer (WDM) comprising:

a structure extending longitudinally from one end to another for supporting components of the WDM;

at least two optical components supported at the one end of the structure for transmitting and receiving optical signals;

a diffraction grating supported at the other end of the structure for diffracting the optical signals from the optical components;

a lens assembly supported by the structure and disposed between the optical components and the diffraction grating, the lens having a focal length for focusing the optical signals in relation to the optical components;

a prism supported by the structure and disposed between the diffraction grating and the lens assembly; and wherein a change in index of refraction with temperature of the prism is a value approximately equal to a negative value of a coefficient of thermal expansion of the diffraction grating, whereby the lens remains focused in relation to the optical components.

36. The optical network of claim 35 wherein the structure has a first coefficient of thermal expansion and the lens assembly has a second coefficient of thermal expansion, and wherein the first and second coefficients of thermal expansion are approximately equal.

37. The optical network of claim 35 wherein the structure has a coefficient of thermal expansion within 3 PPM/degree Celsius of a coefficient of thermal expansion of the lens assembly.

38. The optical network of claim 35 wherein the lens assembly is constructed of a material chosen to minimize its variance in focal length over temperature.

39. The optical network of claim 35 wherein the lens assembly has a change of index of refraction with temperature from 0 to −2.5 PPM/degree Celsius.

40. The optical network of claim 35 wherein the product of a focal length and the sum of an angular dispersion of the prism and an angular dispersion of the grating remains substantially constant with temperature.

41. The optical network of claim 35 wherein a change in index of refraction with temperature of the prism is a value substantially within 30% of a negative value of a coefficient of thermal expansion of the diffraction grating.

42. The optical network of claim 35 wherein a coefficient of thermal expansion of the structure and the change in index of refraction with temperature of the lens are values selected so that the length of the structure changes proportionally with the focal length of the lens in response to temperature changes in the structure and lens, whereby the lens remains substantially focused in relation to the optical components.

43. The optical network of claim 35 wherein the prism is configured to anamorphically compress the diffracted optical signals.

44. The optical network of claim 35 wherein the lens assembly comprises a telephoto lens.

* * * * *